United States Patent
Andresen

[11] 3,913,305
[45] Oct. 21, 1975

[54] BALL AND SLIDE PLATE ASSEMBLY FOR A MOWER SICKLE BAR

[75] Inventor: Arne O. Andresen, Racine, Wis.
[73] Assignee: Walker Forge, Inc., Racine, Wis.
[22] Filed: Mar. 22, 1974
[21] Appl. No.: 453,718

[52] U.S. Cl. .............................................. 56/303
[51] Int. Cl.² ...................................... A01D 55/02
[58] Field of Search ............ 56/296, 297, 303, 307

[56] References Cited
UNITED STATES PATENTS

| | | | |
|---|---|---|---|
| 2,216,790 | 10/1940 | Sebade | 56/303 |
| 2,794,311 | 6/1957 | Dunn | 56/303 |
| 2,803,104 | 8/1957 | Simpson | 56/303 |

Primary Examiner—Louis G. Mancene
Assistant Examiner—Robert F. Cutting
Attorney, Agent, or Firm—James E. Nilles

[57] ABSTRACT

A ball and slide plate assembly for being secured to a mower sickle bar and which furnishes a driving connection between the mower sickle bar and a pitman or the like through which power is transmitted to the sickle. The ball and slide plate includes a slide plate which is readily fabricated as a stamping from sheet steel and also includes an integrally forged, one piece ball and mounting wall for the ball. The one piece forging also includes projections which are inserted in openings in the steel plate, the ends of the projections then being upset to rigidly secure the one piece forging to the steel plate.

11 Claims, 7 Drawing Figures

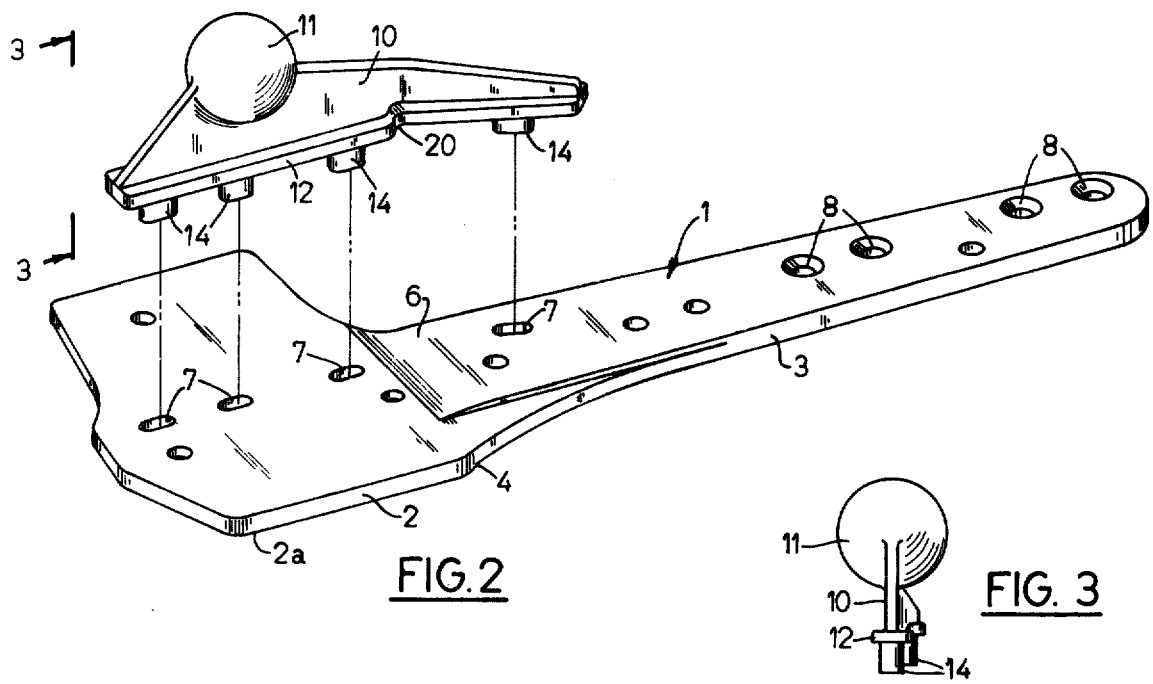
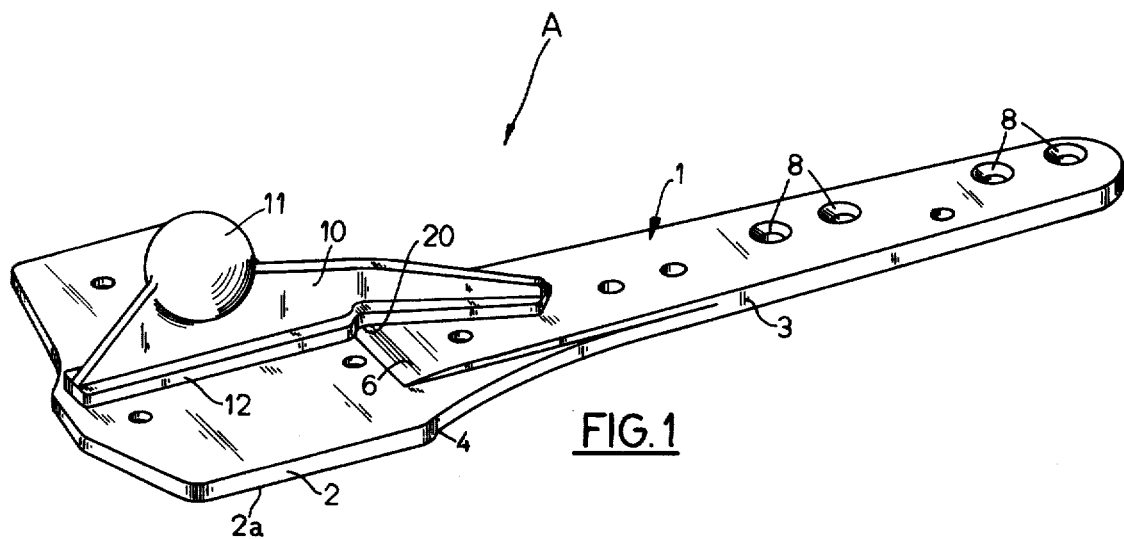
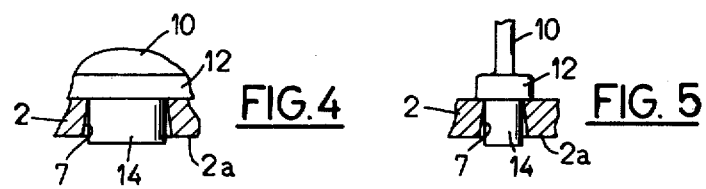
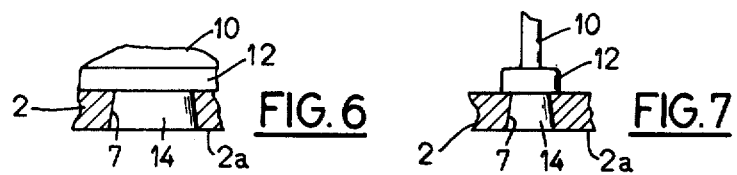

BALL AND SLIDE PLATE ASSEMBLY FOR A MOWER SICKLE BAR

BACKGROUND OF THE INVENTION

Connecting means for connecting a sickle bar to mower drive mechanisms have been proposed in the past and have included, among other things, a forged ball and slide plate which were formed as a single forging. This type of prior art device was costly to forge and was otherwise costly to manufacture.

Examples of prior art devices of this character are shown in the U.S. Pat. Nos. 1,672,363 issued June 5, 1928 and entitled "Mower Bar Construction", U.S. Pat. No. 1,857,699 issued May 10, 1932 and entitled "Harvester Construction"; and U.S. Pat. No. 1,503,734 issued August 5, 1924 and entitled "Harvesting Machine".

SUMMARY OF THE INVENTION

The present invention provides a ball and slide plate assembly for a mower sickle bar and which assembly is formed of two parts, a slide plate fabricated as a stamping from a steel plate, and having openings therethrough which may be formed in the plate simultaneously with the stamping operating, and a forged ball and mounting wall having projections extending downwardly from the wall and which extend through the openings of the stamped plate. The ends of the projections are then upset so as to rigidly secure the one piece forging to the steel plate. The ball and slide plate assembly provided by the present invention is economically produced, efficient in operation, and can be readily assembled with other parts in a precise manner.

These and other objects and advantages of the present invention will appear hereinafter as this disclosure progresses, reference being had to the accompanying drawings.

BRIEF DESCRIPTION OF THE DRAWINGS

FIG. 1 is a perspective view of an assembly made in accordance with the present invention;

FIG. 2 is a perspective, exploded view of the two part assembly shown in FIG. 1;

FIG. 3 is an end view of the one piece forged part shown in FIG. 1;

FIGS. 4 and 5 are sectional views of the projections of the forged part when inserted in the openings of the steel plates, but before the ends of the projections have been upset; and FIGS. 6 and 7 are views corresponding to FIGS. 4 and 5, but showing the assembly after the projections have been upset so as to completely and tightly fill the openings in the steel plate.

DESCRIPTION OF A PREFERRED EMBODIMENT

The one piece ball and slide plate assembly A is comprised of a slide plate 1 which is fabricated as by being stamped or pressed from a steel plate. The slide plate includes a relatively wide and flat base portion 2 and an elongated end portion 3 which is pressed upwardly at the curved juncture 4. During a stamping or pressing operation, the steel plate is also formed with a raised portion 6 which extends above the wide base portion 2. Furthermore, during the stamping or pressing operation, a series of openings 7 are formed in the slide plate 1 and these are generally elongated as indicated in FIG. 2. As shown in FIGS. 5 and 6, these openings are furthermore formed as tapers, that is to say, they diverge in a downward direction so that their lowermost portion is of greater area than the upper end of the openings.

Also during the stamping operation, a series of apertures 8 are formed adjacent the outer end of the narrower extending portion 3 of the plate. Two holes are used to rigidly secure a sickle bar (not shown) to the assembly by bolt means or the like.

The assembly also includes a forging that includes an upwardly extending mounting wall 10 to the upper end of which is forged the ball 11. Adjacent the lower end of the wall is a laterally extending flange 12 which forms a firm seating surface for the wall on the upper side of the steel plate. Also formed integrally as part of the forging are the downwardly extending projections 14 which are elongated in shape so as to complement the shape of the upper end of the openings 7 and thereby snugly fill the upper ends of the openings, thus the ball, wall, flange, and projections are all formed as in integral single piece during the forging operation.

As shown in FIGS. 4 and 5, the projections 14 extend slightly below the lower surface 2a of the plate 2. The lower ends of the projections are then upset so that they are deformed to completely fill the tapered openings, thereby securely locking the one piece forging rigidly to the plate.

It will be noticed that the forging is also formed with a curved portion 20 that complements the curved portion 6 of the plate so as to form a good bearing and connection between the ball assembly and the plate.

By means of the present invention, a major portion of the assembly is securely and quickly formed as a stamping from a steel plate and the necessary openings, holes, and curved portion can all be produced simultaneously in the press. The ball and its mounting including the projections are all formed as a single forging and this one piece forging can be readily, accurately, and securely fixed to the plate.

I claim:

1. A ball and slide plate assembly for a mower sickle bar comprising a steel slide plate having tapered openings therethrough which diverge in downwardly extending direction; an upwardly extending mounting wall having a ball formed at its upper end, said wall having a laterally extending flange adjacent the bottom of said wall to provide a firm fitting engagement with said plate, said wall also having downwardly extending projections, said ball, wall, flange and projections all being forged together as one piece; said projections snugly fitting through said openings and having ends which are upset to snugly engage the walls of said tapered openings and thereby rigidly lock said one piece forging to said steel plate.

2. The assembly set forth in claim 1 further characterized in that said steel plate has a series of apertures therethrough for securing a sickle bar to said steel plate.

3. The assembly set forth in claim 1 further characterized in that said steel plate has a sickle bar attaching portion which is offset upwardly in a vertical direction from the remainder of said steel plate.

4. A ball and slide plate assembly for a mower sickle bar comprising a steel slide plate having tapered openings therethrough which diverge in a downwardly extending direction, an upwardly extending mounting wall having a ball formed at its upper end, said wall having a laterally extending flange adjacent the bottom of said wall to provide a firm fitting engagement with said plate, said wall also having downwardly extending projections; said ball, wall, flange and projections all being forged together as one piece; said projections snugly fitting through said openings and having ends which are upset to engage the walls of said tapered openings and thereby rigidly lock said one piece forging to said steel plate.

5. The assembly set forth in claim 4 further characterized in that said steel plate has a sickle bar attaching portion which is offset upwardly in a vertical direction from the remainder of said steel plate.

6. The assembly set forth in claim 4 further characterized in that said steel plate has a series of apertures therethrough for securing a sickle bar to said steel plate.

7. A method of manufacturing a ball and slide plate assembly for a mower sickle bar comprising the steps of: providing a slide plate having a plurality of holes therethrough which are tapered and diverge outwardly from a surface of said plate; providing a member having a ball, a laterally extending flange and a plurality of projections; assembling said plate and member so that said flange engages said surface of said plate and said projections extend through said tapered holes; and upsetting said projections so that they engage the side walls of said holes and rigidly secure said members to said plate.

8. A method of manufacturing a ball and slide plate assembly for a mower sickle bar comprising the steps of: stamping a sheet of metal to form a slide plate having a plurality of tapered holes extending therethrough, said holes diverging outwardly from a surface of said plate; forging a mass of metal to form a one-piece member having a wall, a ball at one end of said wall, a flange extending laterally from said wall and a plurality of projections at the other end of said wall, assembling said plate and said one-piece member so that said flange engages said surface of said slide plate and said projections extend through said tapered holes, and upsetting said projections to cause them to engage the side walls of said holes and rigidly secure said one-piece member to said plate.

9. The assembly set forth in claim 8 further characterized in that said openings are formed simultaneously with the fabrication of said plate by a stamping process.

10. As an article of manufacture: a one-piece forged member for use in a ball and slide plate assembly for a mower sickle bar comprising: a wall, a ball integrally forged at one end of said wall, a plurality of integrally forged projections at an opposite end of said wall, and an integrally forged flange extending laterally from said wall adjacent said integrally forged projections.

11. As an article of manufacture: a one-piece stamped steel slide plate for use in a ball and slide plate assembly for mower sickle bar, said slide plate having a plurality of tapered holes extending therethrough between opposite surfaces of said plate for securing said plate to another portion of said assembly, said holes diverging from one of said surfaces, said slide plate further having a plurality of apertures therethrough for securing said plate to said sickle bar, and said plate having an attaching portion which is offset upwardly from said one surface of said steel plate.

* * * * *